(12) United States Patent
Zhou et al.

(10) Patent No.: US 10,202,211 B2
(45) Date of Patent: Feb. 12, 2019

(54) FREE-FALLING BODY VERIFICATION DEVICE FOR DRAG-FREE SPACECRAFT

(75) Inventors: Zebing Zhou, Wuhan (CN); Yanzheng Bai, Wuhan (CN); Shuchao Wu, Wuhan (CN); Hongyin Li, Wuhan (CN); Jun Luo, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 1145 days.

(21) Appl. No.: 14/396,782

(22) PCT Filed: Mar. 27, 2012

(86) PCT No.: PCT/CN2012/073110
§ 371 (c)(1),
(2), (4) Date: Oct. 24, 2014

(87) PCT Pub. No.: WO2013/123690
PCT Pub. Date: Aug. 29, 2013

(65) Prior Publication Data
US 2018/0134419 A1 May 17, 2018

(30) Foreign Application Priority Data
Feb. 23, 2012 (CN) .......................... 2012 1 0042617

(51) Int. Cl.
*G01M 19/00* (2006.01)
*B64G 7/00* (2006.01)
(Continued)

(52) U.S. Cl.
CPC ................. *B64G 7/00* (2013.01); *B64G 1/26* (2013.01); *G05D 1/0883* (2013.01); *B64G 2001/245* (2013.01)

(58) Field of Classification Search
USPC ................................... 73/118.01, 118.03, 147
See application file for complete search history.

(56) References Cited

U.S. PATENT DOCUMENTS 3,484,953 A * 12/1969 Norheim, Jr. .......... A63G 31/00
434/247
4,578,037 A * 3/1986 MacAngus ............ A63G 31/00
434/247

(Continued)

*Primary Examiner* — Eric S McCall
(74) *Attorney, Agent, or Firm* — Matthias Scholl P.C.; Matthias Scholl

(57) ABSTRACT

A free-falling body verification device for a drag-free spacecraft comprises a spacecraft simulation device (1), used for carrying out free-falling body motion on the ground; an inertial sensor or accelerometer (2), used for measuring the residual disturbance acceleration of the spacecraft simulation device (1); an attitude sensor (3), used for measuring attitude parameters of the spacecraft simulation device (1); a drag-free controller (4), used for processing the residual disturbance acceleration and the attitude parameters so as to obtain a feedback control signal; and a propeller (5), used for generating thrust action applied on the spacecraft simulation device (1) under the control of the feedback control signal, so as to enable the spacecraft simulation device (1) to overcome the residual disturbance of the external environment and maintain the attitude. The space operating environment is simulated by means of the free-falling body motion of the spacecraft on the ground within short time; the inertial sensor or accelerometer (2), the attitude sensor (3), the drag-free controller (4), and the propeller (5) are combined, so that the performance and function test verification for a space drag-free aerospace system is realized in the technical ground environment within short time.

3 Claims, 1 Drawing Sheet

(51) Int. Cl.
    *B64G 1/26*         (2006.01)
    *G05D 1/08*        (2006.01)
    *B64G 1/24*         (2006.01)

(56) References Cited

U.S. PATENT DOCUMENTS

| | | | | |
|---|---|---|---|---|
| 5,209,702 | A * | 5/1993 | Arenas | A63G 31/00 |
| | | | | 434/238 |
| 5,388,991 | A * | 2/1995 | Morris | A63G 31/16 |
| | | | | 434/34 |
| 7,156,744 | B2 * | 1/2007 | Metni | A63G 31/00 |
| | | | | 472/137 |
| 9,045,232 | B1 * | 6/2015 | Burke | B64D 23/00 |
| 2004/0115593 | A1 * | 6/2004 | Hatlestad | B64D 23/00 |
| | | | | 434/29 |
| 2006/0105300 | A1 * | 5/2006 | Moinel Delalande | |
| | | | | B64D 23/00 |
| | | | | 434/30 |
| 2009/0312111 | A1 * | 12/2009 | Gil | A63G 31/00 |
| | | | | 472/137 |
| 2011/0165545 | A1 * | 7/2011 | Nebe | A63G 31/00 |
| | | | | 434/247 |
| 2011/0256512 | A1 * | 10/2011 | Huang | A63G 31/08 |
| | | | | 434/34 |
| 2014/0200087 | A1 * | 7/2014 | Vatcher | A63G 31/02 |
| | | | | 472/131 |
| 2018/0057193 | A1 * | 3/2018 | Douglas | B64G 7/00 |
| 2018/0067501 | A1 * | 3/2018 | Kobata | B64C 39/024 |

* cited by examiner

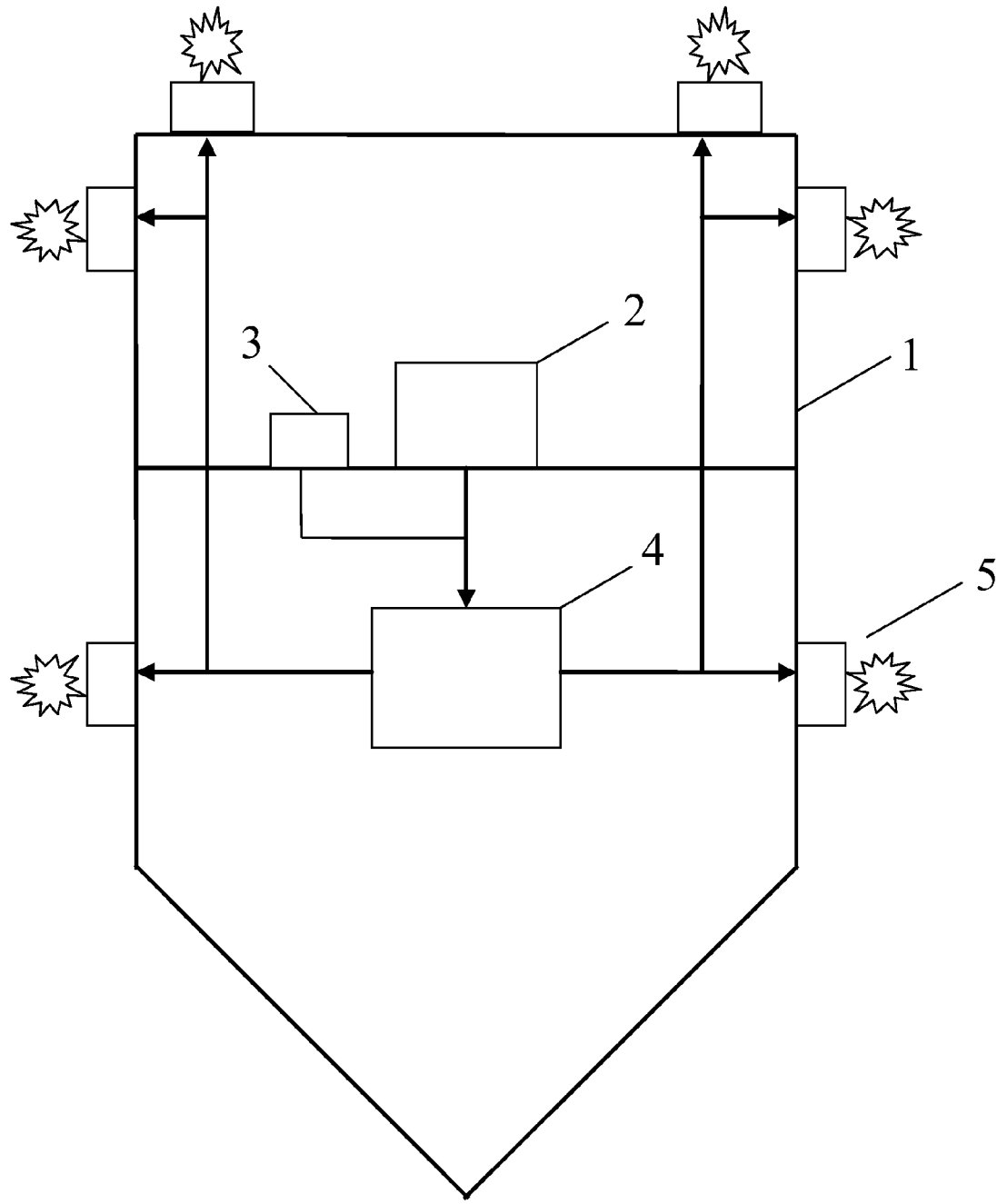

FREE-FALLING BODY VERIFICATION DEVICE FOR DRAG-FREE SPACECRAFT

CROSS-REFERENCE TO RELATED APPLICATIONS

This application is a National Stage Appl. filed under 35 USC 371 of International Patent Application No. PCT/CN2012/073110 with an international filing date of Mar. 27, 2012, designating the United States, now pending, and further claims priority benefits to Chinese Patent Application No. 201210042617.0 filed Feb. 23, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to the drag-free spacecraft control technology field, and more particularly to a free-fall motion verification device for a drag-free spacecraft that is capable of directly simulating operation status of the drag-free spacecraft in a short time on the ground.

Description of the Related Art

Limited by residual disturbance such as atmospheric drag, vibration of satellites, attitude adjustment, and movable components inside satellites in space, microgravity level of the satellites/spacecraft is normally between $10^{-4}$ and $10^{-6}$ $g_0$ (where $g_0$ represents gravitational acceleration of the earth's surface). Due to higher requirement for precision of basic scientific experiments in space, such as high-precision gravitational experiments in space (like gravitational wave detection in space, test on equivalence principle in space and so on) and microgravity experiments in space (generally related to life science, fluid science, combustion science, material science and so on), it is required to further improve microgravity of satellite/experimental platforms.

As far as microgravity experimental platforms in space are concerned, a concept called drag-free satellite was proposed in 1960's, the drag-free satellite was based on high-precision inertial sensors/accelerometers, and used thrusters to compensate residual disturbance force applied thereon, so that the satellite traces inertial reference objects whereby further improving microgravity environment of the platforms. The drag-free technology is of great significance for fundamental scientific research in space, high-precision microgravity experiments, earth observation and deep space exploration. The drag-free technology mainly comprises an inertial sensor/accelerometer, a drag-free controller, and a thruster. The inertial sensor/accelerometer mainly measures displacements and angular variations of the inertial reference objects and the satellite platforms, residual acceleration and disturbance acceleration of the satellite platforms and so on, and requirements for measurement precision are mainly dependent on scientific objectives of the experiment. The drag-free controller controls the thruster according to output of the inertial sensor/accelerometer, and functions as a multi-input multi-output controller. The thruster generates small thrust and moment to compensate the residual disturbance force of the satellite. A thrust precision of the thruster relies on a quality of the satellite, and is normally in the order of magnitude of micro-Newton.

Since the drag-free technology is mainly applied to space environments and thus tests on the ground are comparatively difficult, existing tests on the ground mainly comprises those on some key indexes of the inertial sensor/accelerometer and the thruster, and some simulation methods are used for research on the drag-free controller. However, no ground-based experimental device capable of directly performing complete tests, demonstration and verification on the whole system is available at present.

SUMMARY OF THE INVENTION

It is one objective of the invention to provide a free-falling verification device for a drag-free spacecraft that is capable of simulating all functions of the drag-free technology, and testing some performance specification of an inertial sensor/accelerometer and a thruster, and control algorithms and technical parameters of a drag-free controller whereby providing basis for the on-orbit drag-free spacecraft technology.

To achieve the above objective, in accordance with one embodiment of the invention, there is provided a free-falling verification device for a drag-free spacecraft, comprising: a spacecraft simulator 1 operating to facilitate free-fall motion on the ground, a plurality of inertial sensors/accelerometers 2 each operating to measure residual acceleration and disturbance acceleration of the spacecraft simulator 1, an attitude sensor 3 operating to measure attitude of the spacecraft simulator 1, a drag-free controller 4 operating to process the residual acceleration and the disturbance acceleration measured by the inertial sensor/accelerometer 2, and the attitude measured by the attitude sensor 3 whereby obtaining a feedback control signal, and a plurality of thrusters 5 each operating to generate force under control of the feedback control signal, and to apply the force on the spacecraft simulator 1 whereby enabling the spacecraft simulator 1 to resist residual disturbance from external environment and to maintain an attitude thereof.

In a class of the embodiment, as the number of the inertial sensors/accelerometers 2 is greater than 1, one of the inertial sensors/accelerometers is disposed at a centroid of the spacecraft simulator 1, and the others are distributed at positions of the spacecraft simulator 1 other than the centroid.

In a class of the embodiment, the number of the thrusters 5 is one or more.

In a class of the embodiment, the attitude sensor 3 is a gyroscope.

Advantages according to embodiments of the invention is summarized as follows: the device for verifying free-fall motion of a drag-free spacecraft of the invention simulates running environments in space via free-fall motion of the spacecraft on the ground in a short time, and combines the inertial sensor/accelerometer, the attitude sensor, the drag-free controller and the thruster, whereby facilitating performance and functionality test and verification of the drug-free spacecraft system on the ground.

BRIEF DESCRIPTION OF THE DRAWINGS

The invention is described hereinbelow with reference to accompanying drawings, in which the sole FIGURE is a schematic view of a free-falling verification device for a drag-free spacecraft in accordance with an exemplary embodiment of the invention.

DETAILED DESCRIPTION OF THE EMBODIMENTS

A spacecraft simulator 1 in free-fall motion on the ground is equivalent to simulation of a spacecraft running in space in a short time, and prone to environment factors such as air resistance. Therefore, an accelerometer 2 (one of the accelerometers is disposed at a centroid of the spacecraft simulator, and the others are distributed at positions of the spacecraft simulator other than the centroid, so as to prevent effect caused by mechanical vibration of the spacecraft simulator) and an attitude sensor 3 (the attitude sensor is a gyroscope, a sun sensor, a star sensor, a magnetometer or so on, and preferably the gyroscope) are used to measure the residual acceleration and the disturbance acceleration of the spacecraft simulator 1, and the attitude of the spacecraft simulator 1, respectively, and measurement results being input signals of a drag-free controller 4 (the drag-free controller is a control and adjustment unit featuring following control. By employing an appropriate control algorithm to ensure robustness of the system, non-conservative force of the spacecraft can be compensated or offset via a micro thruster.). Then the drag-free controller 4 analyzes and processes the input signals whereby obtaining the feedback control signal, and applies the feedback control signal to a thruster 5 (to obtain better control and compensation effect, a plurality of thrusters can be disposed in different positions of the spacecraft simulator). Finally, the thruster 5 applies thrust on the spacecraft simulator 1 so that the spacecraft simulator 1 can resist residual disturbance from external environment and maintain an attitude thereof, namely, simulation of the drag-free spacecraft technology on the ground is facilitated in a short time, and it is possible to perform performance and functionality test and verification of a drag-free spacecraft system.

The invention claimed is:

1. A free-falling verification device for a drag-free spacecraft, the device comprising:
    a) a spacecraft simulator (1) operating to simulate free-falling motion on ground;
    b) a plurality of inertial sensors/accelerometers (2) each operating to measure residual acceleration and disturbance acceleration of said spacecraft simulator (1);
    c) an attitude sensor (3) operating to measure attitude of said spacecraft simulator (1);
    d) a drag-free controller (4) operating to process said residual acceleration and said disturbance acceleration measured by said inertial sensor/accelerometer (2), and said attitude measured by said attitude sensor (3) whereby obtaining a feedback control signal; and
    e) one or more thrusters (5) each operating to generate force under control of said feedback control signal, and to apply said force on said spacecraft simulator (1) whereby enabling said spacecraft simulator (1) to resist residual disturbance from external environment and to maintain an attitude thereof.

2. The device of claim 1, wherein as a number of said inertial sensors/accelerometers (2) is greater than 1, one of said inertial sensors/accelerometers (2) is disposed at a centroid of said spacecraft simulator (1), and the others are distributed at positions of said spacecraft simulator (1) other than said centroid.

3. The device of claim 1, wherein said attitude sensor (3) is a gyroscope.

* * * * *